(12) United States Patent
White et al.

(10) Patent No.: US 8,405,770 B2
(45) Date of Patent: Mar. 26, 2013

(54) DISPLAY OF VIDEO WITH MOTION

(75) Inventors: Christopher J. White, Avon, NY (US);
Michael E. Miller, Honeoye Falls, NY (US); John N. Border, Walworth, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 626 days.

(21) Appl. No.: 12/402,577

(22) Filed: Mar. 12, 2009

(65) Prior Publication Data
US 2010/0231800 A1 Sep. 16, 2010

(51) Int. Cl.
H04N 7/01 (2006.01)
H04N 11/20 (2006.01)

(52) U.S. Cl. ........................................ 348/452; 348/459

(58) Field of Classification Search .......... 348/607–628, 348/553–570, 441–459, 440.1; 345/87, 100, 345/94; 382/275
See application file for complete search history.

(56) References Cited

U.S. PATENT DOCUMENTS

| | | |
|---|---|---|
| 4,535,355 A | 8/1985 | Arn et al. |
| 4,769,292 A | 9/1988 | Tang et al. |
| 5,061,569 A | 10/1991 | VanSlyke et al. |
| 5,125,671 A | 6/1992 | Ueda et al. |
| 5,389,965 A | 2/1995 | Kuzma |
| 5,844,532 A | 12/1998 | Silverbrook et al. |
| 5,950,202 A | 9/1999 | Durward et al. |
| 5,967,764 A | 10/1999 | Booth et al. |
| 6,034,481 A | 3/2000 | Haynes |
| 6,044,182 A | 3/2000 | Daly et al. |
| 6,931,065 B2 | 8/2005 | Kim |
| 7,242,850 B2 | 7/2007 | Cok |
| 7,342,963 B2 | 3/2008 | Laurent-Chatenet |
| 8,139,121 B2 * | 3/2012 | Ito ............................... 348/222.1 |
| 2002/0024496 A1 * | 2/2002 | Akimoto et al. ................. 345/98 |
| 2005/0018854 A1 | 1/2005 | Yamamoto et al. |
| 2005/0168492 A1 | 8/2005 | Hekstra et al. |
| 2006/0088161 A1 | 4/2006 | Hashimoto et al. |
| 2007/0041443 A1 | 2/2007 | Ha et al. |
| 2007/0097104 A1 * | 5/2007 | Kuroki .......................... 345/204 |
| 2007/0195737 A1 * | 8/2007 | Walker et al. ................. 370/335 |
| 2007/0229408 A1 | 10/2007 | Primerano |
| 2010/0033502 A1 * | 2/2010 | Comps et al. ................. 345/634 |

OTHER PUBLICATIONS

Shin et al, Motion Interpolation Performance of 120 Hz Display System, SID 08 Digest, 2008.

* cited by examiner

*Primary Examiner* — Michael Lee

(57) ABSTRACT

A method of displaying a video of a scene on a display with reduced motion blur includes: providing the video of a scene having first subframes that have a first input rate and second subframes that have a second input rate, wherein the first subframes correspond to a first region of the display and the second subframes correspond to a second region of the display; and selectively providing the first and second subframes to corresponding regions in the display, and providing the first region of the display with a first update rate and the second region of the display with a second update rate, wherein the first update rate is greater than the second update rate, so that the displayed image has reduced motion blur.

19 Claims, 15 Drawing Sheets

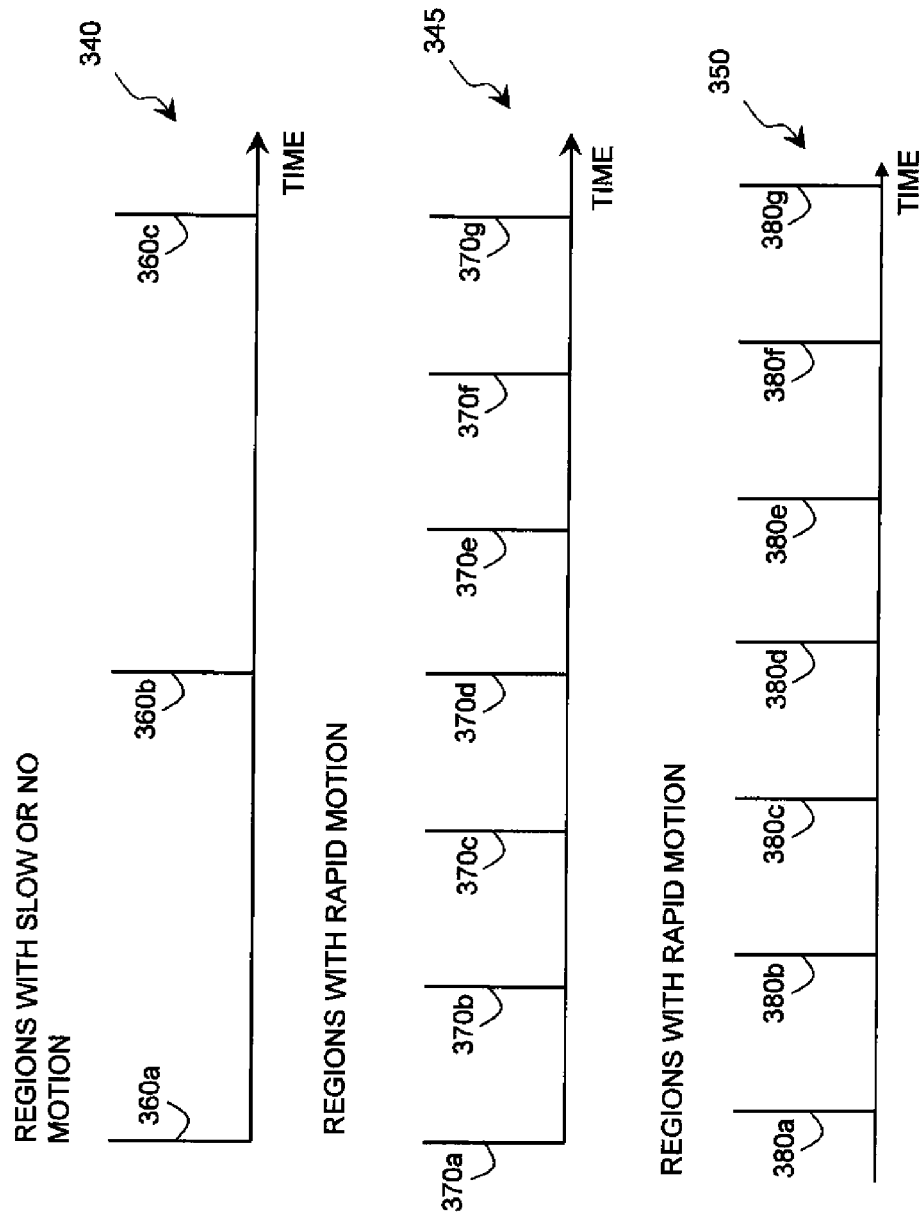

DISPLAY OF VIDEO WITH MOTION

CROSS-REFERENCE TO RELATED APPLICATIONS

Reference is made to commonly-assigned U.S. patent application Ser. No. 12/401,633, filed Mar. 11, 2009, now published as U.S. Publication No. 2010/0231738, entitled "Capture Of Video With Motion" to Border et al., the disclosure of which is incorporated herein.

FIELD OF THE INVENTION

The invention pertains to the display of video images. More specifically the invention pertains to an improved method for display of video images where rapid motion is present.

BACKGROUND OF THE INVENTION

Digital display of videos of scenes is a useful and commonly-practiced technique. Videos typically include a series of individual frames at a selected frame rate, e.g. 24 frames per second (fps), and each frame represents light accumulated for a selected exposure time, e.g. 41.7 ms (=1/24 sec.). Each frame comprises a two-dimensional array of individual pixels.

Scenes, and thus videos of scenes, can contain global motion or local motion. Global motion refers to relative motion between an image capture device and the scene being imaged, such as when a camera is panning across a scene. Local motion refers to motion of objects within the scene, such as a ball being thrown. When a video contains either global motion or local motion rapid enough to cause features within the image to move across more than one pixel during the exposure time of a frame, image quality can be degraded by blurring and smearing of the image. It is therefore desirable to reduce blur of rapidly moving objects in video frames to improve image quality.

Typically higher quality video such as high definition or HD video (720p, 1080i or 1080p) is captured at a higher frame rate, 30 fps or 60 fps, to reduce the blurring associated with motion during capture. However, when rapid motion is present in a scene, such as a ball being thrown in a sporting event, the image of the ball can be noticeably blurred even at 60 fps. Very fast frame rates can be used to reduce blur and improve video image quality of rapidly moving objects. However, as the frame rate is increased, the amount of image data increases proportionately, which can result in data rates too high for data storage, image processing or data transmission bandwidth in imaging systems such as a consumer video camera, a digital camera or a cell phone camera.

One factor in blur of frames on a display is the response time of the display, the time required for the light from a particular pixel to change from one value to the next. Electroluminescent (EL) displays, such as organic light emitting diode (OLED) displays, employ materials that have response times that are measured in microseconds (Samsung reports a response time for their active matrix OLED display of 10 microseconds on their website: http://www.samsungsdi.com/contents/en/product/oled/type01.html). As used herein, the "update rate" of a display is the rate at which the commanded light output of the display is changed. For example, a conventional 24 fps display has a 24 Hz update rate: each time a new frame is received, the display is commanded to output light corresponding to that frame. The update rate is limited by the response time of the display. The low response times of EL displays thus make them theoretically capable of achieving very high update rates However, limitations in the drive electronics of EL displays, the image transmission systems and the image processing system within the video capture devices such as consumer video cameras, a digital camera or a cell phone camera, do not permit update rates above approximately 30 Hz to be supported at higher resolutions. If the capture systems supported very high frame rate with high resolution video capture, such video would require large amounts of bandwidth for transmission and special electronic drives for the display.

Video compression techniques such as described in U.S. Pat. Nos. 6,931,065 and 5,969,764 ('764) are useful in reducing the transmission bandwidth of images, partly based on detecting changes (mean absolute differences) between frames and avoiding the transmission of duplicate image data for multiple frames when the scene is not changing, to reduce data transmission bandwidth and data storage requirements. As such, the technique described in the '764 patent effectively reduces the data transmission rate for regions of the scene that are not changing and keeps the original data transmission rate for areas where motion is present. However, on decompression, video images are reconstructed for display at a constant update rate. As such, this method does not change the display update rate.

U.S. Pat. No. 5,389,965 describes a variable frame rate system for video communication. This system permits the user to select the frame rate used to deliver the desired image quality in a mobile communication environment where data transmission bit rates are limited. Slow frame rates are used to deliver higher resolution images at the expense of jerky motion. Faster frame rates deliver smoother motion with lower resolution images. However, the frame rate is constant within the frame rate selected by the user so as such, the frame rate does not change in response to the motion present in the image being displayed. Further, Cok in commonly-assigned U.S. Pat. No. 7,242,850 provides a method for providing a variable frame rate in a display system where the frame rate is dependent upon the motion within the scene as it was originally captured. This patent discusses changing the rate at which entire frames are delivered within the video sequence and requires the system be capable of adapting to the increased bandwidth required to deliver the higher frame rates during rapid motion.

Within the display literature, it is known to receive video at 60 fps and to up-convert the input video to 120 fps to provide an update rate of 120 Hz to display the video without artifacts. For example, Shin et al. in a paper entitled "Motion Interpolation Performance of 120 Hz Display Systems" published in the SID '08 Digest (2008) discusses producing 120 fps video using interpolation to improve motion blur and judder. By upconverting the input signal within the display device, the video can be displayed at a faster frame rate. However, the display and drivers must be designed to support relatively high-resolution updates at a full 120 Hz. Doubling the rate of such drivers from 60 Hz to 120 Hz can be expensive. Furthermore, in displays such as OLED displays, which typically have a high capacitance and have drive lines with a significant resistance, accurately updating information at 120 Hz and maintaining the full bit depth of the display can present a significant challenge. Further, upconversion to 120 fps does not recognize the problem that significant image blur can be introduced during motion capture, and this motion blur is not reduced through these schemes. This is described in Klompenhouwer (2007), "Dynamic Resolution: Motion Blur from Display and Camera," SID 2007 Digest. As described in this paper, it is important that the image be provided with a short temporal aperture as well as it is important that the display provide a short temporal aperture.

Hekstra et al., in U.S. Patent Application Publication No. 2005/0168492, disclose reducing image blur by decreasing the hold time of the display. Decreasing the hold time increases the update rate, as the display is set to output light corresponding to an image at the frame rate, e.g. 60 Hz, and set to output no light at 60 Hz approximately 180 degrees out of phase with the first updates, resulting in a total update rate of 120 Hz. According to this scheme, an input video can be analyzed to determine the rate of motion and the hold time of a display can be controlled based upon the determined rate of motion. However, this method requires an estimation of the rate of motion directly from the video, which is typically input at 60 fps. Since this video is captured at this rate, it has likely undergone motion blur during capture and this blurring can make the estimation of motion difficult. Therefore, the resulting video will contain artifacts due to errors in estimation of the rate of motion. Further, this method ignores the fact that significant image blur can be introduced during motion capture, and this motion blur is not reduced through this method. Consequently, there exists a need for an improved method for the display of video image data for rapidly moving objects in a way that does not substantially increase the amount of video image data to be processed or substantially increase the bandwidth of the display drivers.

SUMMARY OF THE INVENTION

This need is met by a method of displaying a video of a scene on a display with reduced motion blur comprising:

(a) providing the video of a scene having first subframes that have a first input rate and second subframes that have a second input rate, wherein the first subframes correspond to a first region of the display and the second subframes correspond to a second region of the display; and (b) selectively providing the first and second subframes to corresponding regions in the display, and providing the first region of the display with a first update rate and the second region of the display with a second update rate, wherein the first update rate is greater than the second update rate, so that the displayed image has reduced motion blur.

BRIEF DESCRIPTION OF THE DRAWINGS

FIG. 15 is an illustration of phase relationships according to an embodiment of the present invention.

DETAILED DESCRIPTION OF THE INVENTION

Figure 1:
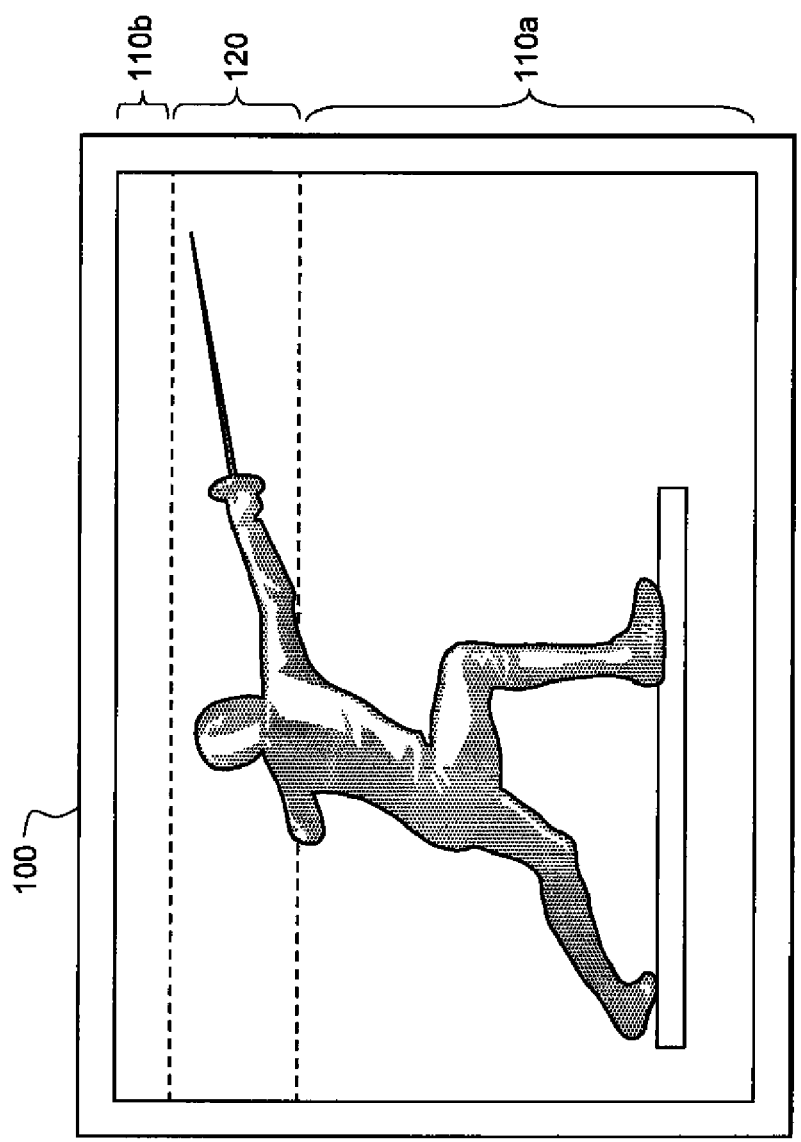
FIG. 1 is an illustration of a display showing an embodiment of the invention.

The invention provides a method to reduce motion blur in a displayed video image by providing an increased rate of image information to the regions of the display that are associated with rapid motion in the image. FIG. 1 shows an illustration of a display 100 showing an image of a person fencing wherein the fencer's arm and the foil are moving rapidly and as a result, those regions of the displayed video image are blurred. In an embodiment of the invention, a video signal of the scene is provided to the display. This video signal has first subframes that have a first input rate $I_1$ and second subframes that have a second input rate $I_2$. The input rates are measured in Hz. First and second subframe input times $J_1$, $J_2$, measured in seconds, are then defined as:

$$J_1=1/I_1; J_2=1/I_2.$$

The first subframes provide information corresponding to a first region of the display, which corresponds to a region for displaying fast motion, for example, corresponding to the first region 120 of the display. The first subframes have a first input rate, for example 120 Hz. The second subframes correspond to a second region of the display, for example, the entire display or the regions without fast motion 110a, 110b. These second subframes can, for example, have a second input rate of 60 Hz.

In this system, the first and second subframes are selectively provided to corresponding regions of the display 100. The first region 120 of the display 100 is then updated with a first update rate and the second region of the display is updated with a second update rate wherein the first update rate is greater than the second update rate. For example, the first update rate can be equal to the total input rate for the first region and the second update rate can be equal to the second input rate. Therefore, the update rate of region 120 is increased where the fencer's arm and the foil are located in the image to reduce blur caused by the rapid motion. In contrast, the update rate for regions 110a and 110b is slower where the motion of the fencer's body is relatively slow and the image is not blurred.

A "region" is a spatial area of the display. A region can include all or a subset of the subpixels or EL emitters within a spatial area of the display. "Update rate" is the rate at which image data or video signals are changed and provided to the subpixels or EL emitters within a spatial area of the display. "Refresh rate" refers to the rate at which subpixels or EL emitters within an area of the display are addressed. The update rate and refresh rate are equal only when the image data or video signals to the display are changed every time an area of the display is addressed. However, a spatial region of the display can be refreshed multiple times with the same input data or video signal and therefore the refresh rate can be greater than the update rate. The first and second regions can each include multiple spatial areas. The first and second regions can intersect spatially, and the first region can be a subset of the second region.

In the illustration shown in FIG. 1, the region with the faster update rate is in the form of entire rows on the display 100 so the region 120 is shown as a rectangle that goes from one edge to the other edge of the display 100. However within the scope of the invention, there can be more than one region with a faster update rate and the region(s) with the faster update rate can be other shapes as well, as required to encompass the regions of the image which contain rapid motion so that a faster update rate can be used to reduce motion blur. The region(s) with the slower update rate encompass the remainder of the display area other than that which is contained in the region(s) with the faster update rate.

Figure 2:
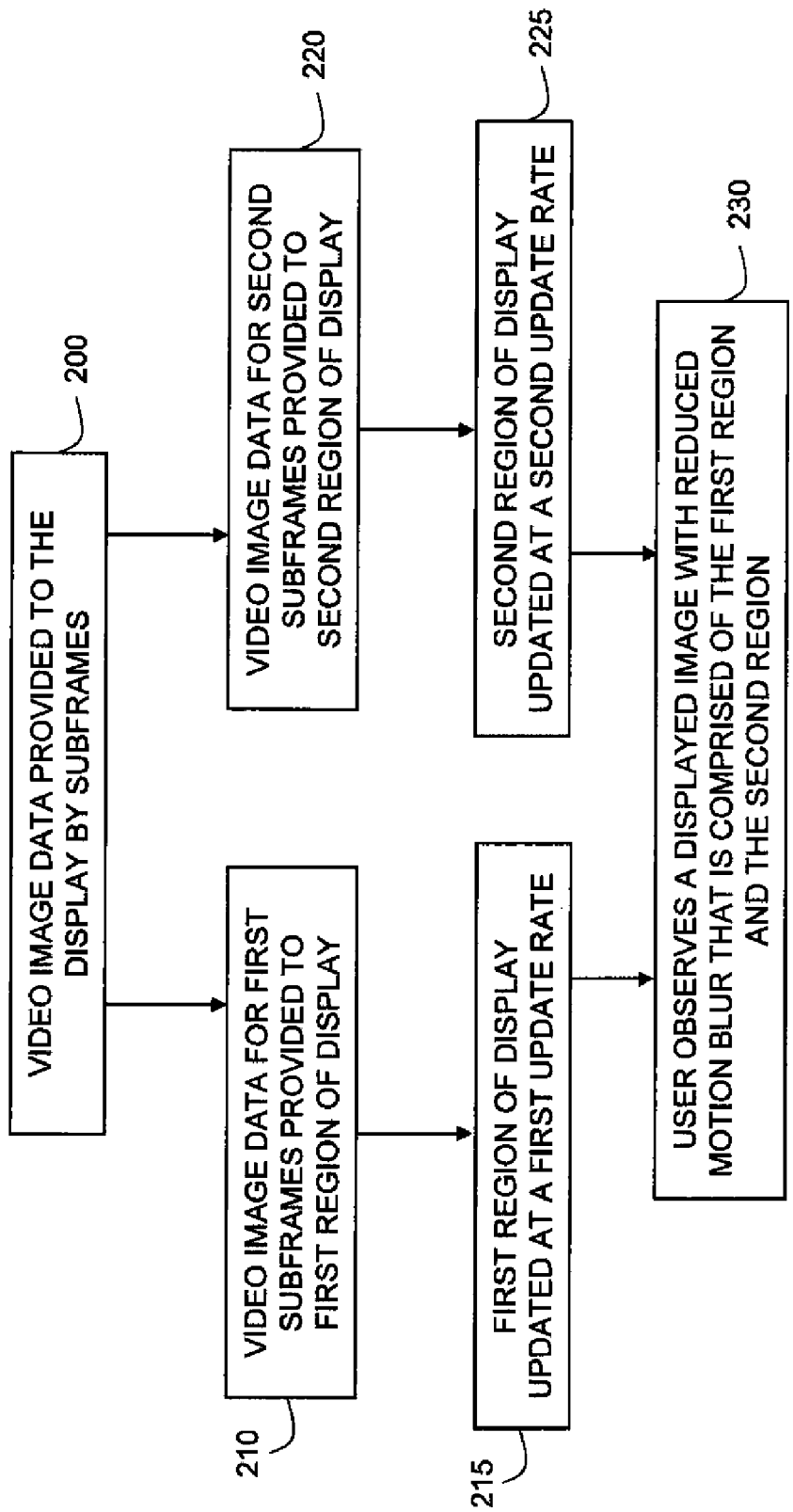
FIG. 2 is a flow chart of a method that constitutes a further embodiment of the invention.

FIG. 2 shows a flow diagram of the method for displaying the video image data according to one embodiment of the invention. In Step 200, the video image data is provided to the display in the form of subframes wherein the image data for subframes with rapid motion is updated at a faster rate than the subframes with slow or no motion. Subframes with locally varying update rates that relate to the speed of motion present can be provided as captured with a locally varying capture rate or as computer-generated images with a locally varying rendering rate. In Step 210, the video image data for first subframes is provided to a first region on the display and in Step 220 video image data for second subframes is provided to a second region of the display. In Step 215, the first region of the display is updated at a first update rate and in Step 225, the second region of the display is updated at a second update rate. The update rate of the first region of the display is faster than the update rate of the second region of the display because the first region of the display is associated with the first subframes of the video image, which contain areas of rapid motion. In Step 230, the user observes a displayed video image with reduced motion blur that includes the combined first and second regions of the display.

Figure 3:
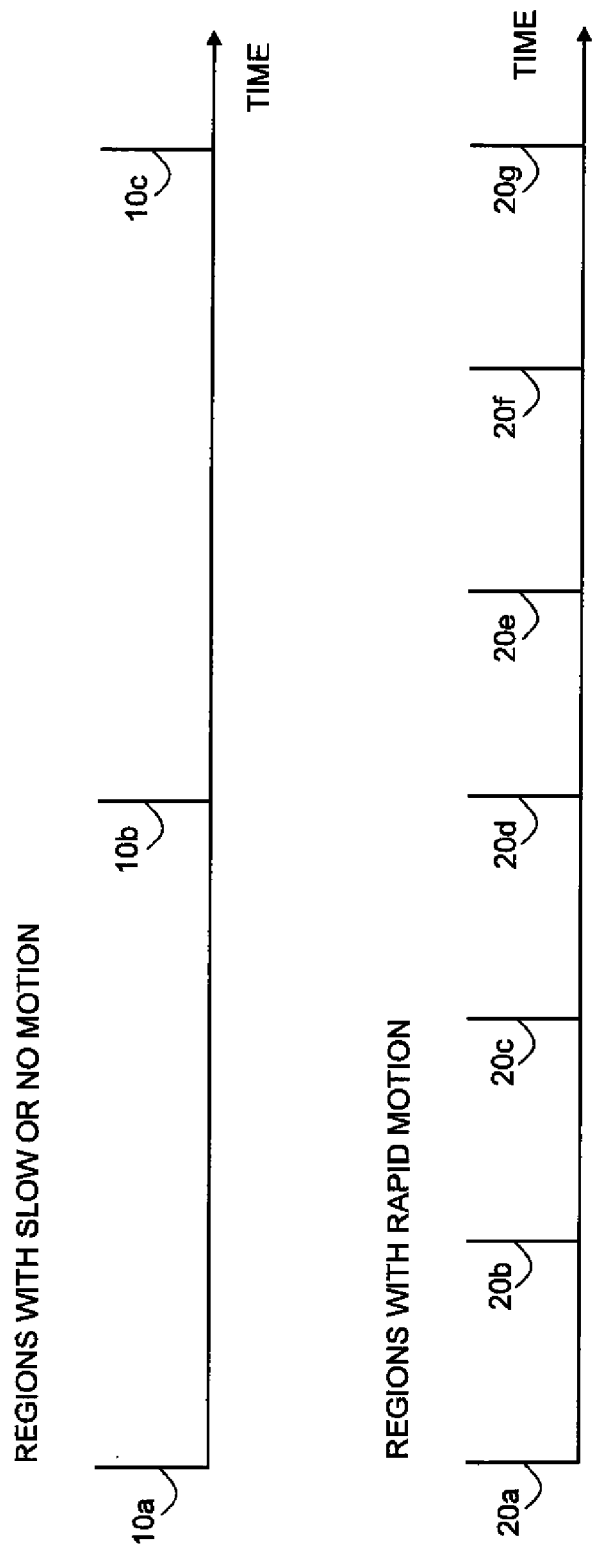
FIG. 3 is a schematic diagram of the timing of display updates for different regions within the displayed image in another embodiment of the invention.

FIG. 3 shows an illustration of an example of the relative timing of the updates of the different regions of the display in an embodiment of the invention. In this example, the regions of the display with rapid motion have an update rate that is 3× faster than the regions with slow or no motion as exemplified by the 7 pulses 20a, 20b, 20c, 20d, 20e, 20f, 20g signifying the initiation of an update for the regions with rapid motion as compared to the 3 pulses 10a, 10b, 10c signifying the initiation of an update for the regions with slow or no motion within the same time interval. By increasing the update rate for the regions with rapid motion, the regions with rapid motion have ⅓ the amount of motion blur that would have been present if the update rate was the same as the regions with slow or no motion.

Figure 4:
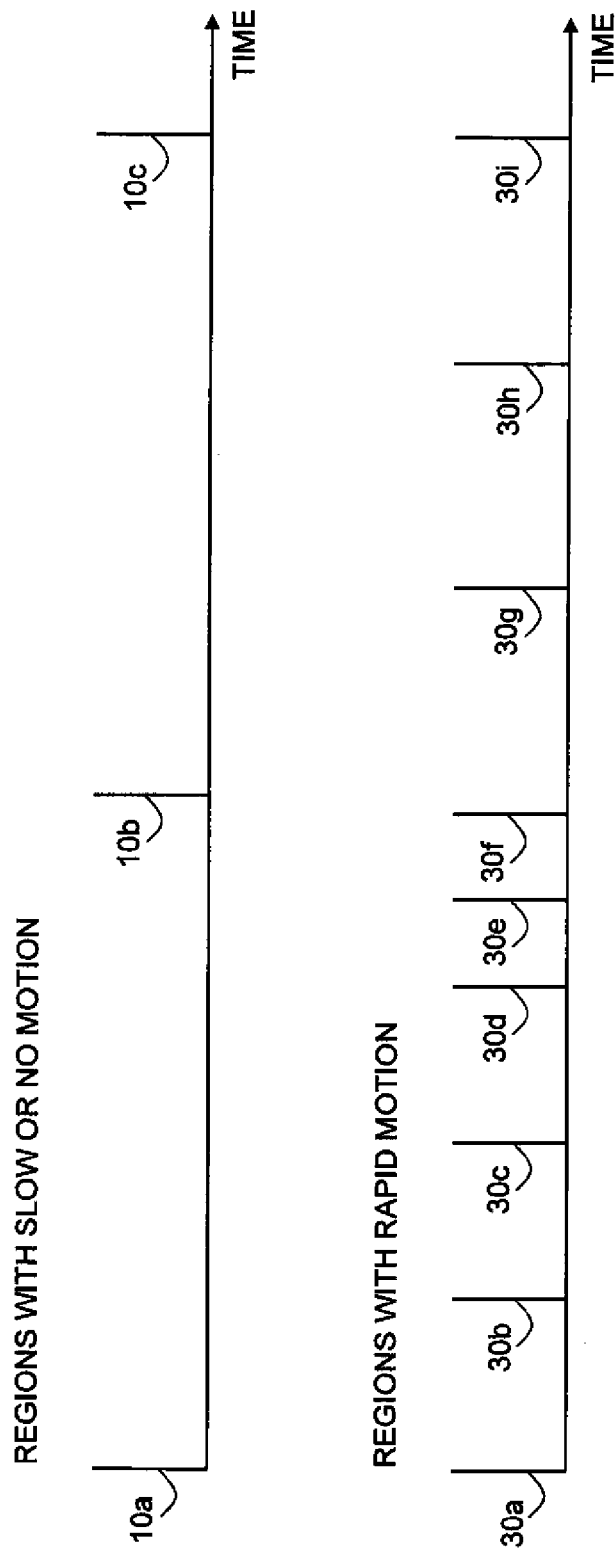
FIG. 4 is a schematic diagram of the timing of display updates for different regions within the displayed image in yet another embodiment of the invention.

FIG. 4 shows an illustration of another example of the relative timing of the updates of the different regions of the display in another embodiment of the invention. In this example, the update rate, specified in updates per unit time for the regions with rapid motion, changes as the motion present in the region speeds up and slows down. Specifically, FIG. 4 shows that the 9 pulses 30a, 30b, 30c, 30d, 30e, 30f, 30g, 30h, 30i signifying the initiation of an update for the regions with rapid motion are not at a constant spacing as a function of time, and therefore these regions do not have a constant update rate. In contrast, the update rate for the regions with slow or no motion is slower than the update rate for the regions with rapid motion and the update rate for the regions with slow or no motion remains constant as indicated by the three equal-distant pulses 10a, 10b, 10c.

In general, increasing the update rate of regions of the display results in an overall increase in the bit rate or bandwidth required to display the video image data. Increasing the bit rate or bandwidth is acceptable in some displays, but in many display systems the bit rate or bandwidth is limited. Consequently, in an additional embodiment of the invention, increases in the update rate of or the size of the regions with rapid motion can be accompanied by decreases in the update rate of other regions of the display, specifically the regions with very slow or no motion. This balancing of increased update rate for some regions and decreased update rate for other regions enables the image quality of the regions of the display with rapid motion to be improved and the overall bit rate or bandwidth required in the display system to be maintained or reduced. In one embodiment of the invention, the balancing of the changes in update rate are done based on the relative areas of the regions associated with rapid motion compared to the regions associated with slow or no motion. For example, a small area of rapid motion in the video image would require a large increase in update rate to reduce the motion blur. This increase in update rate for the small area of the image would be balanced by a small decrease in update rate for a much larger area of the image (or even the entire remainder of the image) where there is slow or no motion present.

Figure 5:
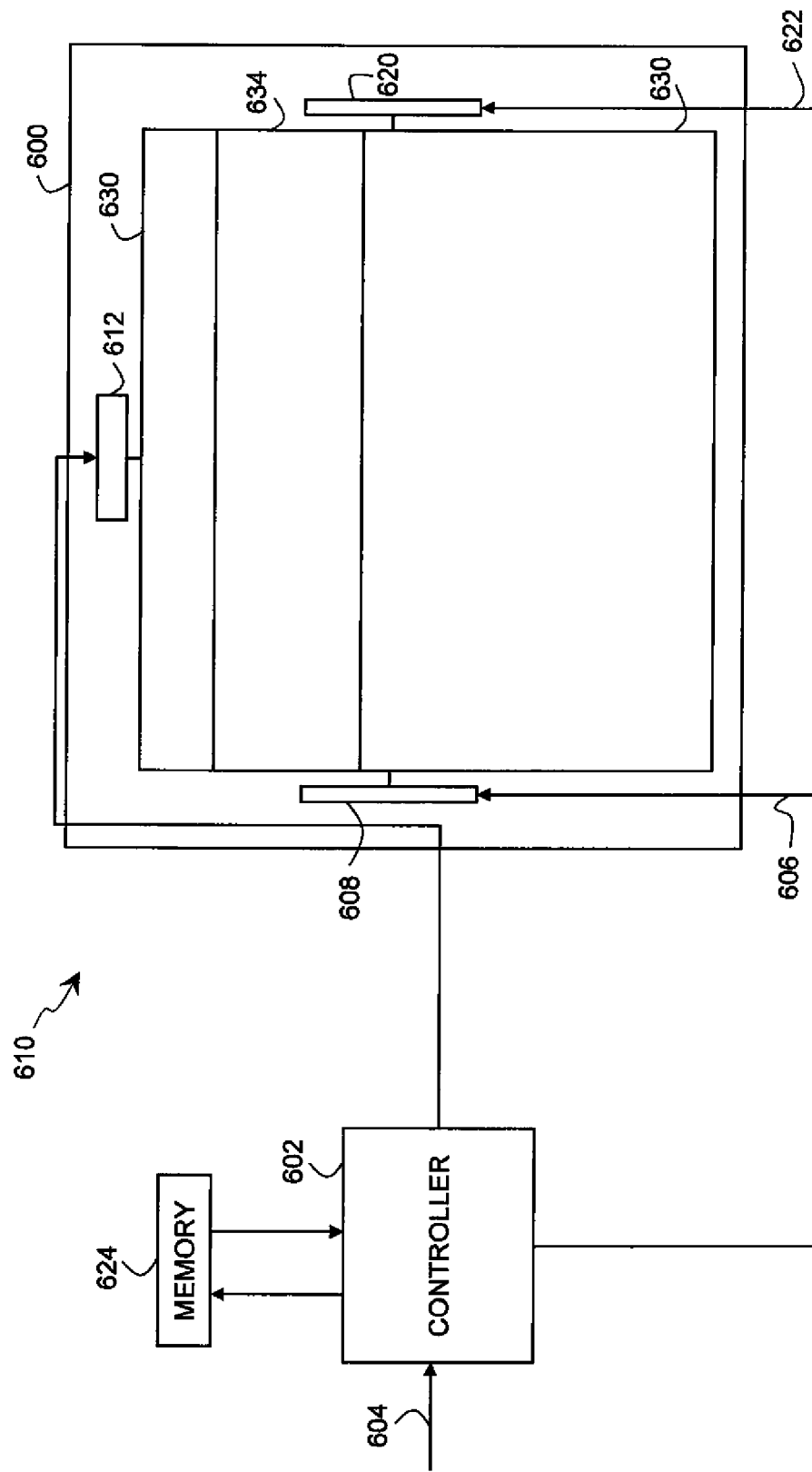
FIG. 5 is a schematic diagram of a display system useful in practicing the present invention.

Referring to FIG. 5, in a first detailed embodiment of the present invention, the display system includes an EL (electroluminescent) display. A display system 600 includes a controller 602 for receiving a video signal 604. This video signal includes first subframes that have a first input rate and second subframes that have a second input rate. The first subframes correspond to a first region of the display 634 and the second subframes correspond to a second region of the display 630. In this embodiment, the first region of the display 634 is a subset of the second region of the display 630. The first region of the display 634 has a corresponding total input rate, which is greater than or equal to the greater of the first input rate and the second input rate but greater than the second input rate. Further, the first update rate is greater than or equal to the total input rate.

The total input rate $I_t$ is the rate, in Hz, at which new information is provided to the first region of the display. When the first and second regions overlap wholly or partially, the total input rate for the overlapping area is constrained as follows:

$$\min(I_1, I_2) \leq I_t \leq I_1 + I_2$$

That is, the total input rate is less than or equal to the sum of the first input rate and the second input rate but equal to or larger than the smaller of the first or second input rates. The exact value of the total input rate when these rates are periodic depends on $I_1$ and $I_2$ and a phase relationship $\Phi$ between the first and second subframes.

In some embodiments, $I_1 = nI_2$ for some integer n>1. Phase relationship $\Phi$ can then be expressed in degrees or radians by dividing the time from a second subframe to the next first subframe by $J_2$ and multiplying by 360°. When $\Phi = 0°$, first and second subframes are in phase. Every second subframe thus arrives at the same time as a first subframe. In this case the total input rate is equal to the higher of the first and second input rates. When $\Phi \neq 0°$, the first and second subframes are out of phase, meaning every second subframe arrives at a different time than every first subframe. In this case the total input rate is equal to the sum of the first and second input rates. For example, FIG. 15 shows three timing diagrams 340, 345, 350. Timing diagram 340 depicts the initiation of the second subframes as signals 360a, 360b, 360c. Timing diagram 345 depicts initiation of first subframes 370a through 370g when Φ=0°. As such, the total input rate is equal to the first input rate. Timing diagram 350 depicts initiation of first subframes 380a through 380g when Φ=180°. In this example, the total input rate is equal to the sum of the first and second input rate.

In some embodiments, $I_1 \neq nI_2$ for all integers n>1. The first and second input rates thus beat together, and $$I_t = I_1 + I_2 - (I_1 - I_2), \text{ for } I_1 > I_2.$$

That is, the total input rate is equal to the number of times per second either the first or second region is updated, since the total input rate corresponds to the overlap between the two regions, minus the number of times per second the two regions update simultaneously (which is the beat frequency term $I_1 - I_2$). When the regions update simultaneously, the overlapping area can be updated with data from either region, as the two have equivalent content.

Subframes can also be delivered aperiodically. For example, the first subframes can each require different time intervals, or the first subframes can be delivered within the period other than that in which the second subframes are delivered. The total input rate, which corresponds to the first region, is always greater than the second input rate. For example, when the second subframe corresponds to the entire display, the first subframes are stored to provide data intermediate to the second subframes within the temporal domain, providing a total input rate for the first region of 180 Hz when the second subframes are delivered at a rate of 60 Hz and the first subframes are delivered at a rate of 120 Hz between successive second subframes (Φ≠0°). Referring back to FIG. 1, when the second subframe corresponds to the regions without fast motion 110a and 110b, the first subframes can be recorded synchronously with the second subframes with Φ≠0°, providing a total input rate for the first region of 120 Hz. As such, first region 120 containing the fencer's arm is provided with a total input rate that is greater than the input rate for the remainder 110a, 110b of the scene.

Figure 6:
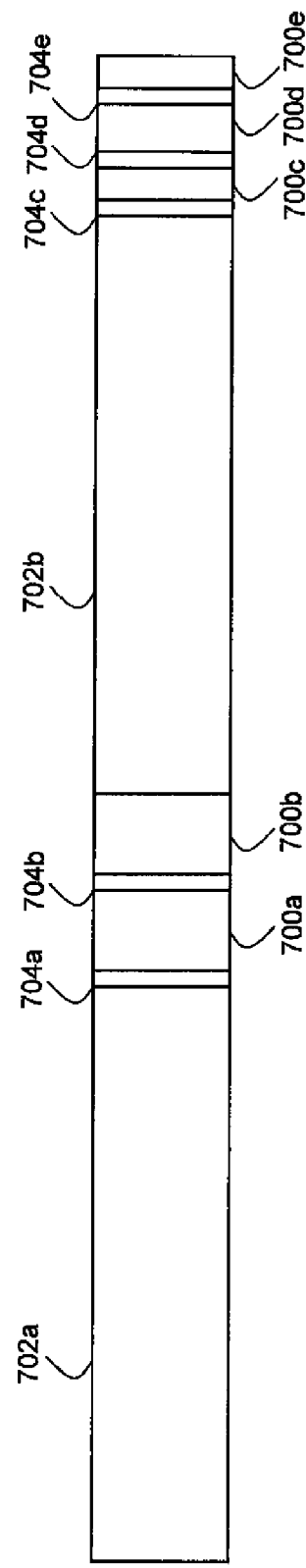
FIG. 6 is a timing diagram illustrating the timing of first and second subframes according to one embodiment of the present invention.

In this first detailed embodiment, the video signal comprises a temporal sequence as shown in FIG. 6. The temporal sequence includes first subframes 700a, 700b, 700c, 700d, 700e and second subframes 702a, 702b. In this example, the second subframes include data corresponding to the entire display to be updated by the input video signal and include each row of data, provided in a time sequential order. The first subframes 700a, 700b, 700c, 700d, and 700e include data corresponding to the first region of the display, which fully overlap and therefore are a subset of the second region as they correspond to a region within the display. The first regions represent regions of the display that correspond to regions of the original scene in which rapid motion occurred. In this example, the first subframes include a time sequence of data corresponding to a sequence of row information. The video signal, as shown, also includes region location data 704a, 704b, 704c, 704d, and 704e associated with the first subframes 700a, 700b, 700c, 700d, and 700e. This region location data 704a, 704b, 704c, 704d, and 704e defines the location of the first region for each first subframe with respect to the second region, the display, or the capture medium. In this example, where the second region corresponds to the entire display and the first region corresponds to a rectangular portion of the display, the region location data 704a, 704b, 704c, 704d, and 704e can define the location of the top left corner and bottom right corner of the first region within the second region. As shown in this example, the number of first subframes are not required to be the same with respect to the number of second subframes. Further the region location data 704a, 704b, 704c, 704d, and 704e can be provided for each first subframe 700a, 700b, 700c, 700d, 700e and can precede the first subframe of data to provide instructions on the portion of the display to be updated, such that it is not necessary to store data before receiving the first subframes 704a, 704b, 704c, 704d, and 704e.

Figure 7:
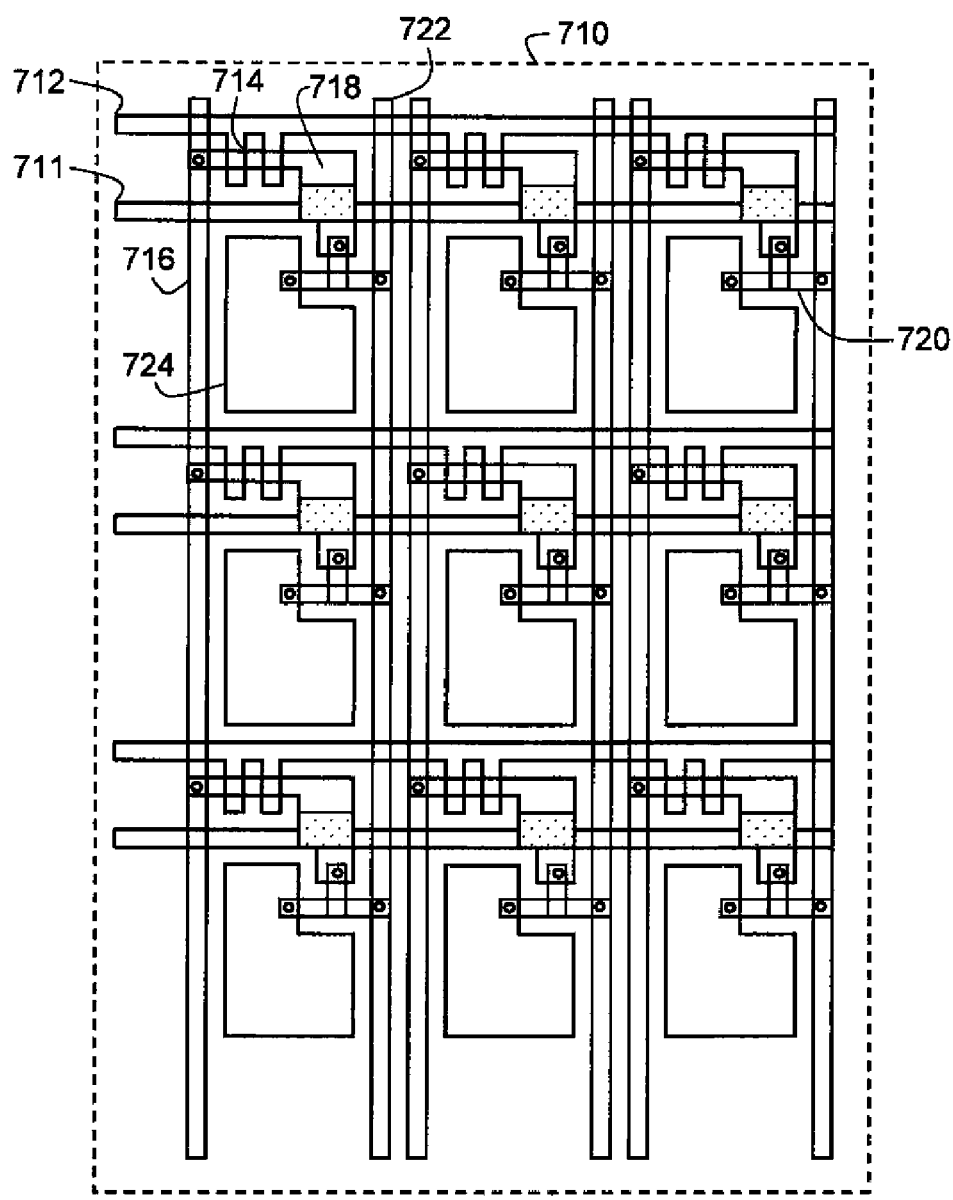
FIG. 7 is an illustration of an active matrix EL circuit layout useful in practicing the present invention.
Figure 8:
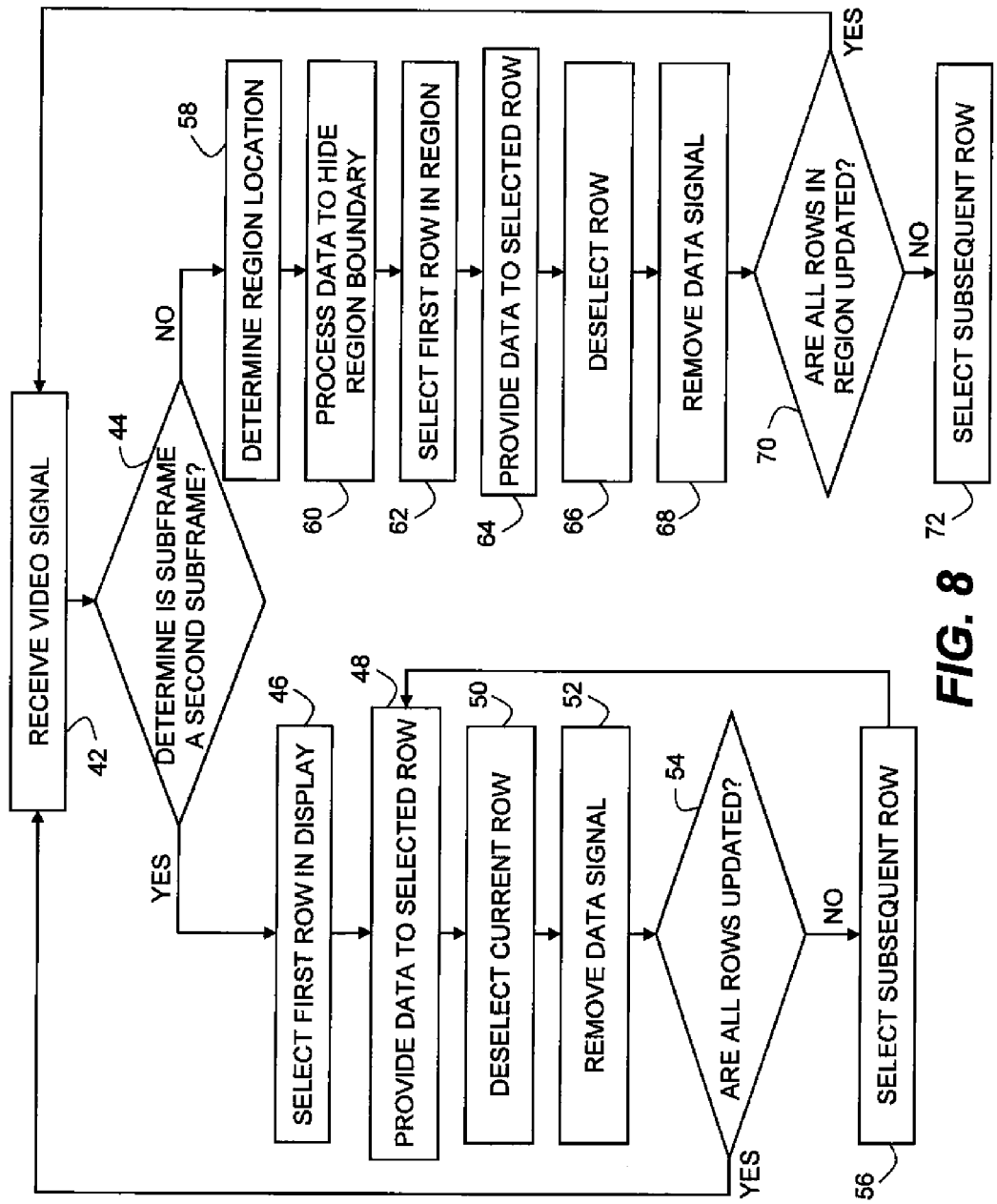
FIG. 8 is a flow chart illustrating the steps that constitute a further embodiment of the present invention.

Referring to FIG. 8, and also to FIGS. 5 and 7, in an embodiment of the present invention, the controller 602 receives a video signal 604 in Step 42. As the video signal 604 is received in Step 42, the controller 602 determines if the subframe is a first or a second subframe in Step 44. This can be done, for example, based upon the presence or absence of region location data as the region location data is required only for first subframes. If a second subframe 702a is received, the controller 602 provides a control signal 606 to a first row driver 608 to select a first row of electroluminescent (EL) emitters in the display in Step 46 beginning at the top of the display. The controller 602 then provides drive signals 610 to column drivers 612 for each EL element within the selected row of EL emitters in Step 48, which provide a voltage to the EL elements within the row. The controller 602 then provides a signal to the first row drivers 608 to deselect the row of EL emitters in Step 50 and provides a signal to the column driver 612 to remove the data signal from data lines 716 of the display in Step 52. The controller 602 then determines if all rows of the display have been updated in Step 54. If not, the controller 602 provides a signal to the first row driver 608 to select the subsequent row of the display in Step 56 and repeats steps 48, 50, 52, and 54. If the controller 602 determines that all of the rows have been updated in Step 54, the controller 602 continues to receive the video signal in Step 42 and determine if the next subframe is a first or second subframe in Step 44.

Upon completing the update of the display in response to the second subframe 702a, 702b, it then receives a first subframe 700a. Upon determining the presence of a first subframe in Step 44, the controller 602 determines the region location based upon the region location data 704a, 704b, 704c, 704d, 704e in Step 58. It then processes the data within the first subframe in Step 60 to hide the boundary between the first and second subframes, as will be discussed below, and commands the first row driver to select the first row within the first region corresponding to the first subframe in Step 62. The controller 602 then provides a control signal to the column driver to provide data to each active matrix circuit of each EL emitter in Step 64. The controller 602 commands the first row driver to deselect the row in Step 66 and the column driver to remove the data signal from the data line in Step 68. The controller 602 then determines if all rows in the region have been updated (Step 70). If not, it causes a subsequent row to be selected (Step 72) and repeats steps 64, 66, 68 and 70. Once all rows in the region have been updated, the controller 602 continues receiving the video signal in Step 42 and determining if the next subframe is a first or second subframe in Step 44.

The first row driver 608 can quickly select the first row within the first region of the display by sequencing the first row driver 608 through the rows of the display or by commanding the first row driver 608 to randomly access a row. For the random access case, a random-access gate driver such as that set forth in commonly-assigned U.S. Patent Application Publication No. 2007/0229408 by Primerano, can be used. This random-access gate driver receives an address signal and includes a random access decoder for activating a gate line corresponding to the address signal. According to the present invention, the number of the first row within the first region of the display can be provided to the gate driver as the address signal.

As indicated by the signal depicted in FIG. 6, the controller 602 can then continue this process by receiving another set of region location data 704b for first subframe 700b. Subframe 700b is then processed and presented using the method depicted in FIG. 8. Once these two first subframes have been displayed, the following second of the second subframes 702b is received Step 42 by the controller 602, which commands the first row driver 608 to initially select the first row of EL emitters in the display and then continues to provide drive signals to the column driver 612 and command the first row driver 608 to sequentially select each of the rows of EL emitters within the display according to the method of FIG. 8. First subframes 704c, 704d, and 704e are then received and processed, according to the method of FIG. 8. In this way, the first regions of the display are updated a total of 7 times while the second regions are updated only 2 times during the same period.

To successfully provide such an image on the display, the EL display shown in FIG. 5 can preferably have certain characteristics to enable the periodic and non-sequential update of portions of the second display regions. To understand these characteristics, it is useful to understand the active matrix structure commonly employed in an active matrix EL display as depicted in FIG. 7. This figure shows a portion 710 of an active matrix backplane useful in an EL display of the present invention that includes select lines 712. These lines carry a signal from the first row driver 608 to the circuit at each EL element in the display, with each row of EL emitters typically sharing the same select line 712. When a high voltage is placed on this select line 712, the gate of the select TFT 714 is opened. This permits a signal to be carried from the data line 716 as provided by the column driver 612 to a capacitor 718. Once this signal, typically a voltage signal, is provided by the data line to the capacitor 718, the first row driver 608 deselects this row of EL emitters by placing an inverse logic signal, typically a low voltage, on the select line 712. This deselection precludes the capacitor 718 from receiving additional current or voltage signals through the data line 716 until the select TFT receives another selection signal. A capacitor line 711 can also be provided and connected to the other side of the capacitor 718 to provide a reference voltage. Once this capacitor 718 is charged, it provides a voltage to the power TFT 720, opening this TFT and permitting current to flow from a power line 722 to an electrode 724 of the EL element, causing the EL element to produce light.

The amount of current that is permitted to flow from the power line 722 to the electrode 724 is proportional to the voltage stored on the capacitor 718. Further, the luminance output of the EL element is proportional to this current and therefore to the voltage on the capacitor 718. In an ideal system, the voltage on the capacitor 718 would remain constant indefinitely unless the row driver 608 provided a select signal on the select line 712 and the column driver 612 on data line 716 provided a different data signal. Unfortunately, the dielectric in typical capacitors 718 is far from ideal and leakage currents occur, which reduce the voltage of the capacitor 718 as a function of time. Within the system of this example, this implies that the non-overlapping regions of the first and second region, which are updated less frequently will become lower in luminance as a function of time, and the areas that are updated more frequently will lose less luminance. Therefore a sudden gradation in luminance can exist between the boundaries of the first and second regions, which can produce a visible and undesirable artifact.

The visibility of artifacts can be reduced according to the present invention. Capacitor 718 can be sized to hold enough charge that a luminance loss of less than or equal to four percent occurs between updates of the second regions of the display. Alternatively, the signal for each update of the first region of the display can be reduced to bring the respective luminances of the first and second regions within a selected percentage of each other, e.g. four percent. In another alternative, the luminances of those pixels in the first region which are near the boundary between the first and second region are reduced to provide a gradual gradient in luminance between the first and second regions, thereby making this transition much less visible. As such, the method further includes modifying selected pixel values in the first subframe or second subframe to reduce the visibility of boundaries between the first region and the second region in the displayed video.

Figure 14:
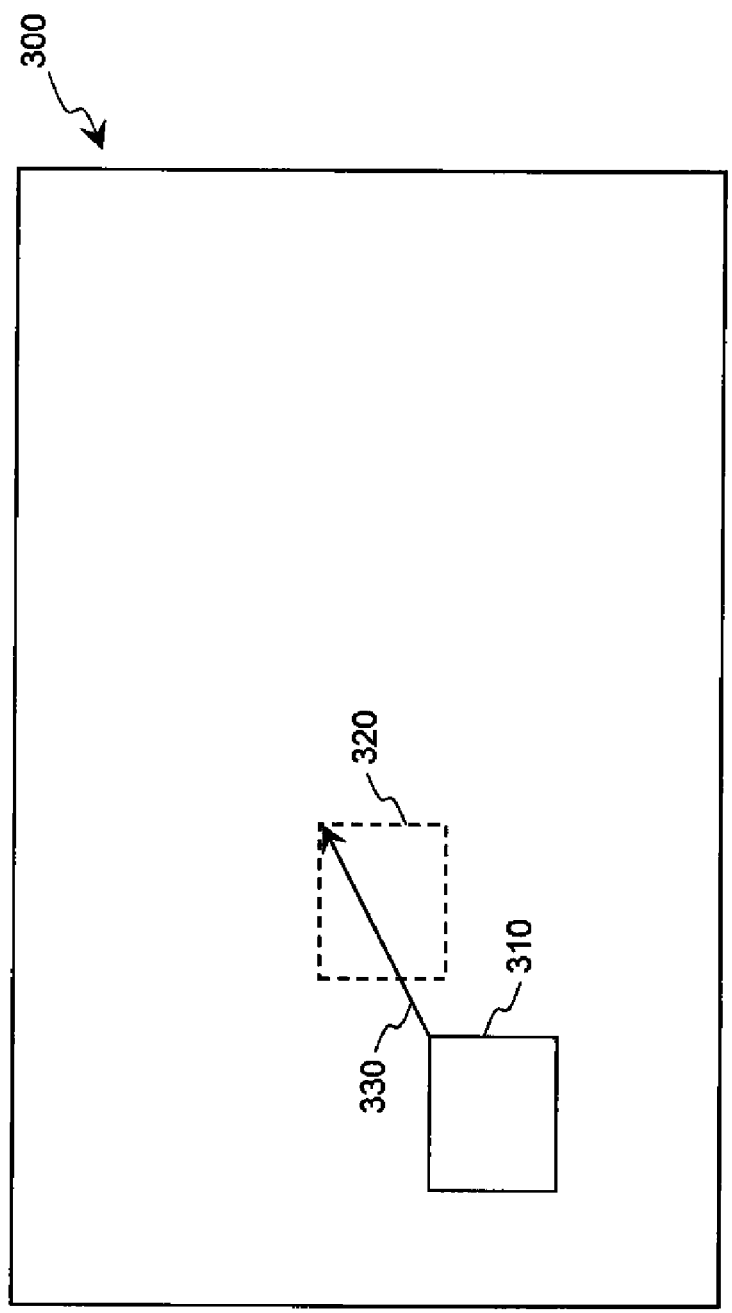
FIG. 14 is an illustration of motion vectors according to an embodiment of the present invention.

The first subframes and their associated image data, can be compressed in a number of ways to reduce the bandwidth required to transmit them. For example, it is well known to compress motion data through the use of motion vectors, to encode the motion of objects within a scene rather than repeating image data for multiple frames of image data. Therefore it can be desirable for at least the first subframes to include motion vectors, which can be decoded. A motion vector is a mathematical description of the motion of objects or features within a region within the image. For example, in an image region 300 as shown in FIG. 14, an object in motion can move from location 310 in a first frame to another location 320 in a second frame due to the relative motion of the object between the times of capture of the first and second frames. The motion vector 330 describes the motion of the object so that the location of the object 320 in the second frame can be specified in terms of knowledge of the location of the object 310 in the first frame and the direction and length of the motion vector 330. Thus this method can substantially reduce the bandwidth required to encode the information for moving objects. In such systems, the controller can require access to a memory 624 to store previous subframes of image data to which the motion vectors can be applied to determine the image data to be displayed.

Figure 9:
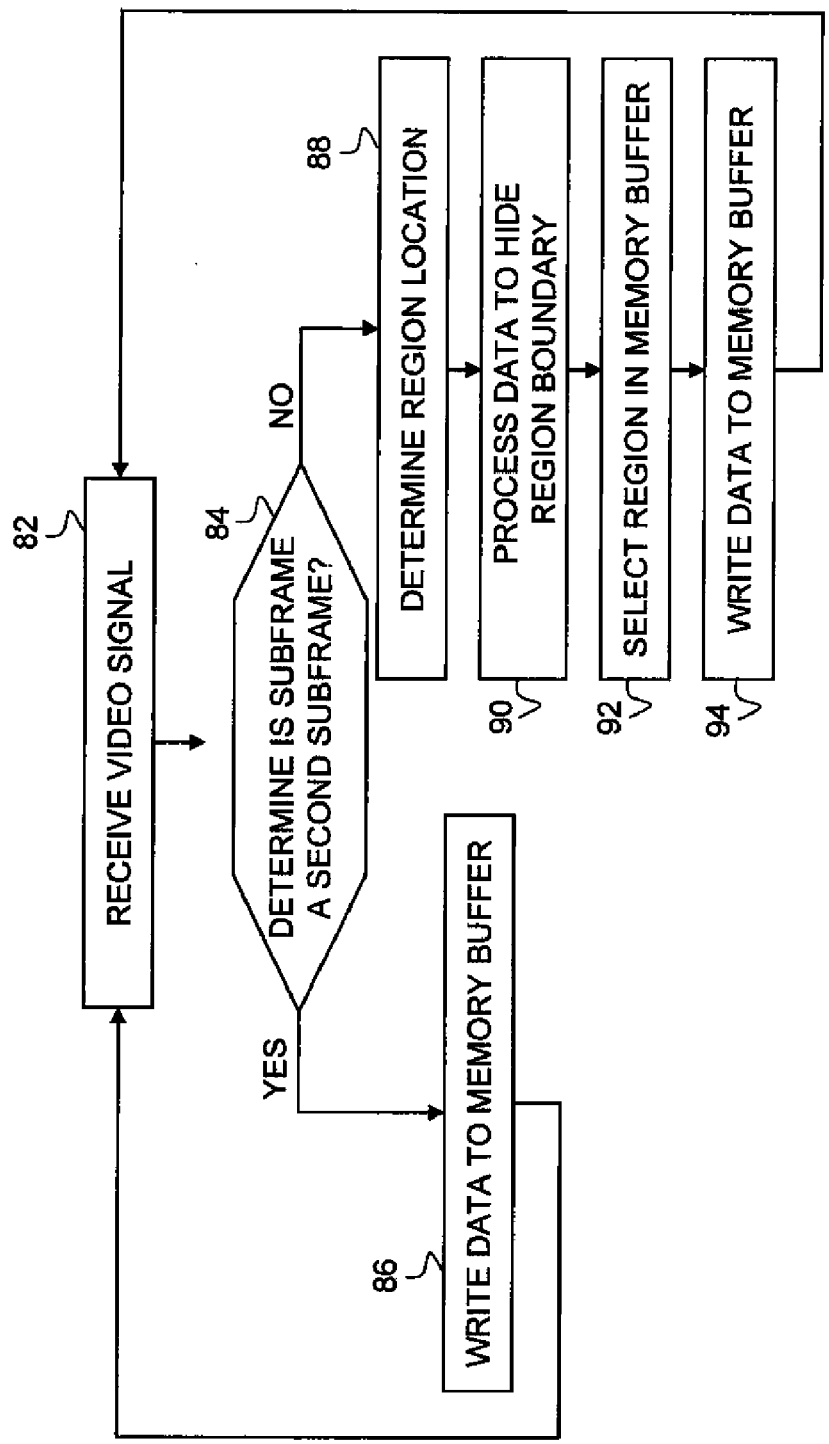
FIG. 9 is a flow chart illustrating the steps that constitute a further embodiment of the present invention.

Referring to FIG. 5, it can be useful for the display to provide memory 624, permitting only the rows of the display that are to be updated to be physically refreshed with new information. It can also be useful to refresh the entire display, by selecting and providing each line of the display with information without updating the information to all of the EL emitters in the display. In such a display system, at least the second subframes and additionally the first subframes can be stored in memory 624 either within or accessible by the controller 602. In this system, the controller 602 commands each and every row of the EL emitters in the display at a rate that is at least as high as the first input rate to be refreshed. However, the EL emitters within the second region are refreshed with data from memory 624 and are therefore updated with new information at a rate equal to the second input rate. In such systems, the update rate within the first regions of the display is higher than the input rate of the second subframes as these second subframes are stored in memory 624 and used to refresh the display multiple times during which the first subframes are used to update the first regions of the display at a rate that is higher than the second input rate. As such, the method includes storing the video of a scene in memory 624 and the display can be simply refreshed by reading each data point from memory 624 and addressing the display with the information that is present within the memory. Within this embodiment, the present invention provides a method for updating the memory 624, which is then used to refresh the display. However, because the first regions are updated in memory 624 more frequently than the second regions, the first update rate of the first regions is faster than the second update rate of the second regions FIG. 9 shows a flow chart for updating the memory 624 according to this embodiment. As shown in FIG. 9, the video signal is received by the controller in Step 82. The controller 602 determines if the subframe being input is a first or second subframe in Step 84. If it is a second subframe, as depicted in FIG. 6, the entire second subframe is written to memory 624 in Step 86 to provide a full frame buffer for refreshing the display. The controller 602 then continues to receive the video signal in Step 82 and in Step 84 determines if the next subframe is a first or second subframe. As depicted in FIG. 6, this subframe is a first subframe. In response to the first subframe, the controller 602 then receives the region location information to determine the region location in Step 88. The data in the first subframe is then processed in Step 90 to hide the region boundary. A region is then selected in memory 624 corresponding to the region of this first subframe in Step 92. Data is then written into this memory at the location corresponding to the region of this first subframe in step 94. Again, an additional video signal is received Step 82). As this memory is continuously updated, the controller can sequentially read each line from the memory and sequentially refresh each row of the display with the information from within the memory.

In the previous example, the first region is a subset of the second region of the display. In another example, the first and second regions do not overlap. In this example, the method of displaying the video of a scene on a display with reduced motion blur includes providing video of a scene having first subframes that have a first input rate and second subframes that have a second input rate, wherein the first input rate is greater than the second input rate. The first and second subframes are provided to the corresponding regions in the display, wherein the first region of the display has a first update rate and the second region of the display has a second update rate wherein the first update rate is greater than the second update rate. Further, the first update rate is equal to the first input rate enabling the first update rate to be greater than the second update rate. Referring again to FIG. 1, the first region 120 is represented by first subframes. The second regions 110*a*, 110*b* are represented by second subframes and the first region 120 and second regions 110*a*, 110*b* do not overlap in this example.

In a third example, the method of displaying a video of a scene includes providing video of a scene having first subframes that have a first input rate and second subframes that have a second input rate, wherein the first subframes correspond to a first region of the display and the second subframes correspond to a second region of the display. The method then selectively provides the first and second subframes to corresponding regions in the display, the first region of the display having a first update rate and the second region of the display having a second update rate. In this example, the first update rate is greater than the second update rate and the first update rate is greater than the first input rate. This can be achieved by a number of methods. In one particular embodiment, the display system shown in FIG. 5 can additionally include a second row driver 620, which is controlled by a signal 622 from the controller 602. This second row driver 620 can attach to the same select lines 712 as the first row driver 608 and can permit the select TFTs 714 to be activated twice within an update cycle. However, during the time that the second row driver 620 opens the select TFTs on a row, the column driver 612 can be commanded by the controller 602 to serve as a current sink, permitting the voltage to be removed from the capacitors 718 and deactivating the EL emitters in a row of the display. The second row driver 620 can deactivate the rows in the first region of the display without deactivating the rows of EL emitters in the second region of the display.

Figure 10:
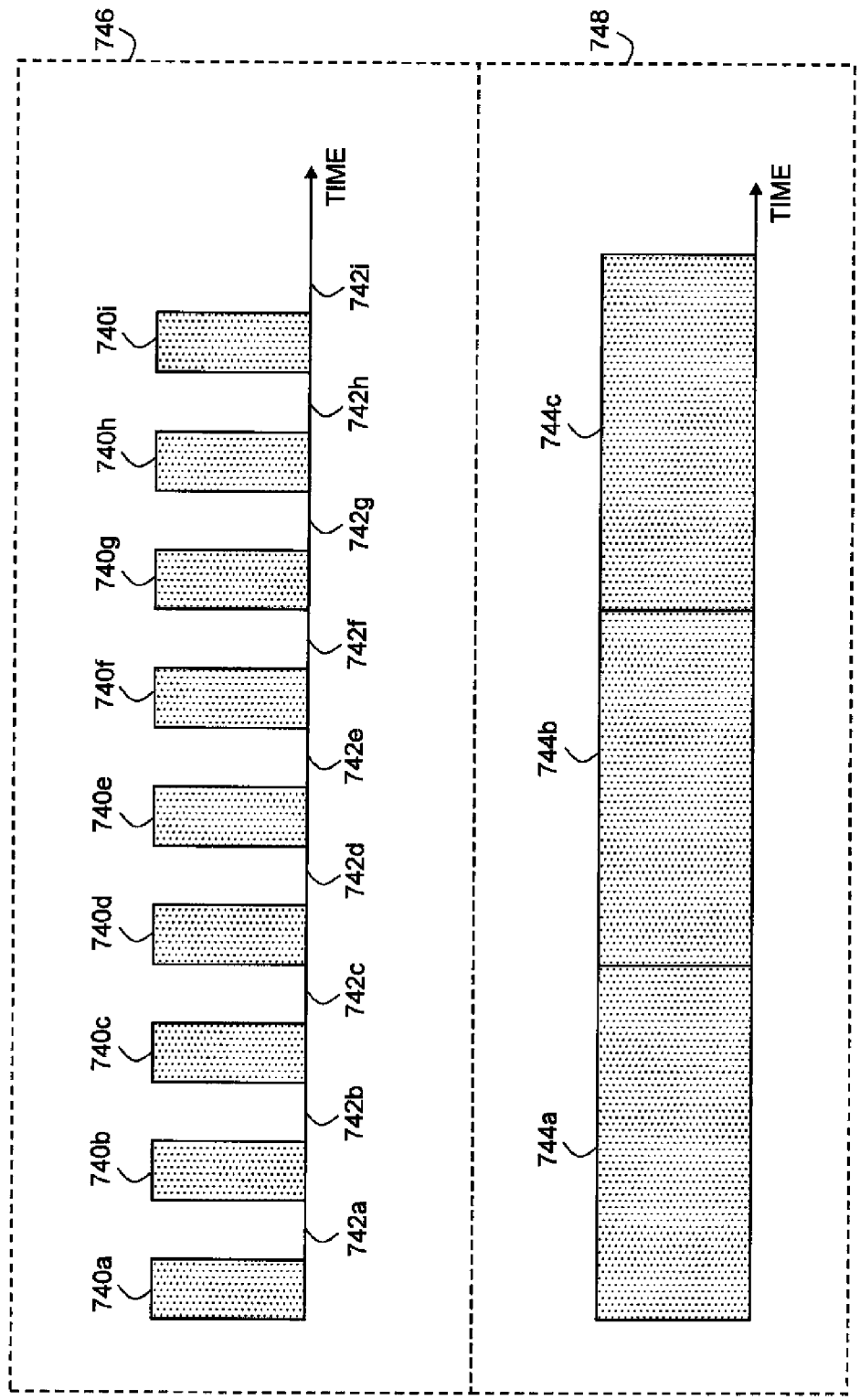
FIG. 10 is a timing diagram illustrating the timing of first and second subframes according to an embodiment of the present invention.

FIG. 10 shows a timing diagram 746 for a row of EL emitters within the first region and a corresponding timing diagram 748 for a row of EL emitters within the second region of the display. As shown in this figure, the timing diagram 746 for rows of EL emitters within the first region depicts the fact that the EL emitters in the row are activated 9 times to provide 9 intervals 740*a*, 740*b*, 740*c*, 740*d*, 740*e*, 740*f*, 740*g*, 740*h*, 740*i* during which the EL emitters are active. Within this example, the input rate is adjusted such that the EL emitters within the row are activated at a rate that matches the input rate of the first subframes within the first regions. This first activation rate can be achieved by synchronizing the select signal provided by the first row driver 608 with the input rate of the first subframes within the video signal 604. However, the update rate of the EL emitters within the first region is further increased as the second row driver 620 provides a select signal to activate the select TFTs 714 within the interval between the time that the first row driver 608 provides a select signal in response to subsequent first subframes in the video signal 604 which correspond to the spatial location of this row of EL emitters and the column driver 612 sinks the current from the capacitors 718 to deactivate the EL emitters within the first region of the display within this time interval. Therefore, as shown in the timing diagram 746, although each EL element within the row of the first region is activated in response to a first subframe within the video signal, each EL element within the row of the first region is deactivated, providing 9 deactivation intervals 742*a*, 742*b*, 742*c*, 742*d*, 742*e*, 742*f*, 742*g*, 742*h*, 742*i* with each deactivation interval occurring between the time that the video signal 604 provides a portion of the first subframe corresponding to this row of EL elements. As such, the update rate for each row of EL element within the first region is twice the input rate of the first subframes. By decreasing the on-time (i.e., the time that each EL element is active in response to an input signal) of each EL element within the first region of the display, motion blur within this region is further reduced.

In this example, EL elements within the second region can have an update rate that matches the input rate of the second subframes within the second region. The timing diagram 748 depicts such an example. Specifically, the timing diagram 748 for rows of EL emitters within the second region depicts the fact that the EL emitters in the row are activated 3 times to provide 3 intervals 744*a*, 744*b*, 744*c* during which the EL emitters within this row of the second region are active. Since these EL emitters are only activated 3 times in the same interval as the EL emitters within the first region as depicted in timing diagram 746, the first input rate for the first subframes is higher than the second input rate for the second subframes. However, as shown, the update rate of the EL emitters within the row is equal to the input rate of the second subframes. That is, the EL emitters within the row of the second region are active during the entire time between receiving portions of the second subframe of the video signal corresponding to the row of EL elements.

In this example, it can be noted that the on-time for the EL elements within the first region is shorter than the on-time for the EL elements within the second region. That is, the EL emitters within the first and second regions of the display have a different duty cycle, wherein the duty cycle refers to the ratio of the on-time to the time between activations of the EL elements. Therefore, luminance, which is integrated over space and time, can be lower within the first region than the second region, unless the video signal for one of these regions is adjusted. Therefore, within a further embodiment of the invention, the video signal is adjusted to increase the instantaneous luminance within the first region or decrease the instantaneous luminance within the second region to adjust for a difference in EL element on-time.

In the example depicted using FIG. 10, the input rate for the first subframes is higher than the input rate for the second subframes and the update rate within the first region is higher than the input rate of the first subframes. However, it is only required that the update rate within the first region be higher than the update rate within the second region. In fact, it can be desirable to provide first subframes and second subframes at equal input rates but to provide an update rate in the first region that is higher than the update rate in the second region. However, it is required that the video signal contains information, such as timing information for the first subframes, to permit the display to distinguish the first subframes from the second subframes. In each of the previous examples, the first subframes are defined by the presence of additional image data to allow the first region of the display to be updated at a rate that is higher than the second region of the display. This additional image data is provided through the presence of additional subframes.

In another example, a capture device or a graphics rendering system can provide first and second subframes within a first input rate that is equal to the second input rate, but define the first subframes to reduce the amount of data required. In this example, the capture device or graphics rendering system can determine the motion within different regions of the video and define first and second subframes by including motion rate indicators within the video. The motion rate indicators are dependent upon the rate of motion of objects within the subframes. For example, the motion rate indicators can include exposure time indicators corresponding to the integration time that was required to capture or render each subframe without motion blur, e.g. 16 ms or 8 ms. The motion rate indicators can also include capture rate indicators corresponding to the frequency of scene captures per unit time, e.g. 60 Hz or 120 Hz. The motion rate indicators can also include a motion map indicating, for each pixel or region of each frame of the video of the scene, how that pixel or region's image data moves between consecutive frames or with respect to a previous frame. In addition, motion maps can be produced from motion vectors as is well known in the art. These motion rate indicators can be provided for each subframe, for only the first subframes or for each pixel. Further, the motion rate indicator can include different resolutions of motion rate information. The rate indicator can be a single bit, which together with region location data indicates the presence and location of first subframes. Alternatively, only the region location data for the first subframes can be provided and the first subframes defined by this region location data can have a motion rate indicator that indicates a relatively higher rate of motion within the first subframes than in the second subframes. The motion rate indicator can further include several bits, allowing further specification of the relative or absolute rate of motion within one or more first regions within the video.

Figure 11:
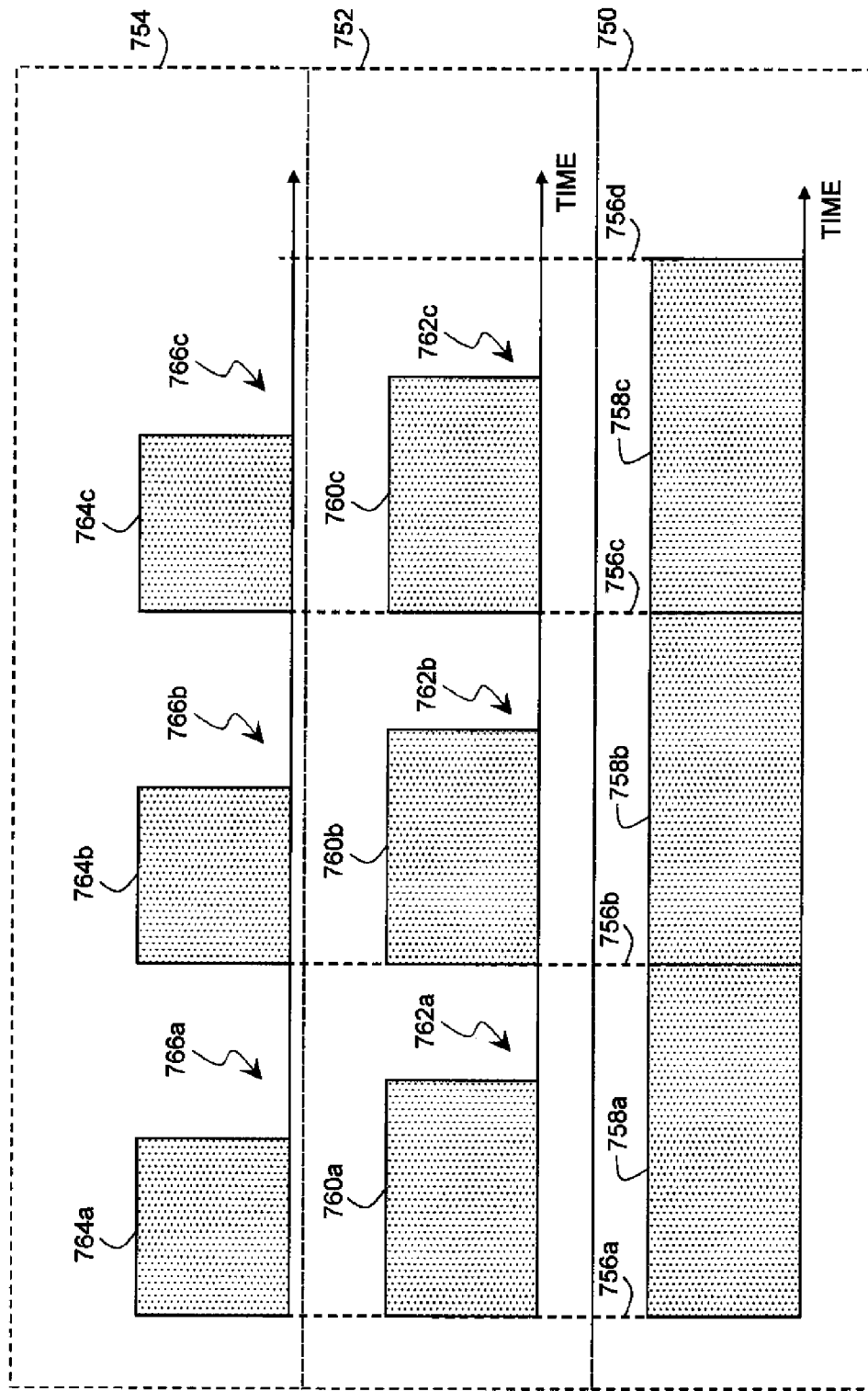
FIG. 11 provides timing diagrams illustrating light emission of the display in response to first and second subframes according to an embodiment of the present invention.

FIG. 11 shows three timing diagrams 750, 752, 754 for an example system having equal first and second data rates with a motion rate indicator to define the first and second subframes. In this system, the video can be provided by a video signal including first and second subframes, where the first subframes include a motion rate indicator. In this example, the times 756a, 756b, 756c, 756d indicate the times that a select signal and data is provided to a row for four sequential subframes.

A timing diagram 750 is shown for a second subframe and two additional timing diagrams 752, 754 are shown for two first subframes having different rate indicators. The timing diagram 752 has a motion rate indicator indicating that the motion within this first subframe is faster than the motion within the second subframe having the timing diagram 750. However, the timing diagram 754 has a motion rate indicator, which indicates that the motion in the first subframe having timing diagram 754 is faster than the motion in the first subframe having timing diagram 752.

As shown, the timing diagram 750 for the second subframe includes three updates which cause the row to emit light for three intervals 758a, 758b, and 758c following the times 756a, 756b, and 756c, respectively. As this second subframe contains no or very slow motion, the duty cycle for the EL emitters within this row is 100% and the EL emitters are driven to emit light for the entire available time. Therefore, the EL elements are driven at a relatively low peak luminance as the human eye integrates the light output over the entire time. Because there is no or little motion, the fact that the human eye integrates this light over the entire time causes little or no motion blur on the human retina and the image produced by this row of EL emitters appears sharp.

Similarly, the timing diagram 752 is shown for one of the first subframes, where the first subframe is input at a rate equal to the rate of the second subframes and therefore this timing diagram also includes three updates which cause the row to emit light for three intervals 760a, 760b, and 760c following times 756a, 756b, and 756c, respectively. As this first subframe contains faster motion than the second subframe, the duty cycle for the EL emitters within this row is less than 100% and is depicted to be approximately 75%. So that the time intervals 760a, 760b and 760c where the EL emitters are activated occupy a larger % of time compared to the time intervals 766a, 766b, and 766c during which the EL emitters are deactivated. That is the EL emitters are driven to emit light for 75% of the available time between the times that the first subframes are input. As a result, the EL elements are driven at a higher peak luminance for the same input image signal than the EL elements within a row of the second region as the human eye integrates this light over the entire time interval even though light is present for 75% of the time. Because the light pulse is shorter than for the second subframe, the amount of blur present on the human retina as the user tracks an object in the motion across this row is reduced and even though motion is present within this first region, the image appears relatively sharp to the user.

The timing diagram 754 is shown for another of the first subframes, this first subframe having a motion rate indicator indicating faster motion than the first subframe corresponding to timing diagram 752. Once again, the first subframe is input at a rate equal to the rate of the second subframes and therefore this timing diagram also includes three updates, which cause the row of EL emitters to emit light for three intervals 764a, 764b, and 764c following times 756a, 756b, and 756c, respectively. As this first subframe contains faster motion than the first subframes having the timing diagram 752, the duty cycle for the EL emitters within this row is reduced further. As shown, the on-times 764a, 764b, and 764c are about equal in time to the time intervals 766a, 766b, and 766c during which the EL emitters are deactivated, providing a 50% duty cycle. Once again, the EL elements within this first region are driven at a higher peak luminance for the same input image signal than the EL elements within a row of the second region or a row of a first region having a motion rate indicator which indicated slower motion as shown in 752, as the human eye still integrates this light over the entire time interval (represented by 764*a* + 766*a* for example) to determine luminance even though light is present for 50% of the time. Because the light pulse is even shorter, the amount of blur present on the human retina as the user tracks an object in the video across this row is further reduced and even though more rapid motion is present within this first region, the image appears relatively sharp to the user.

Figure 12:
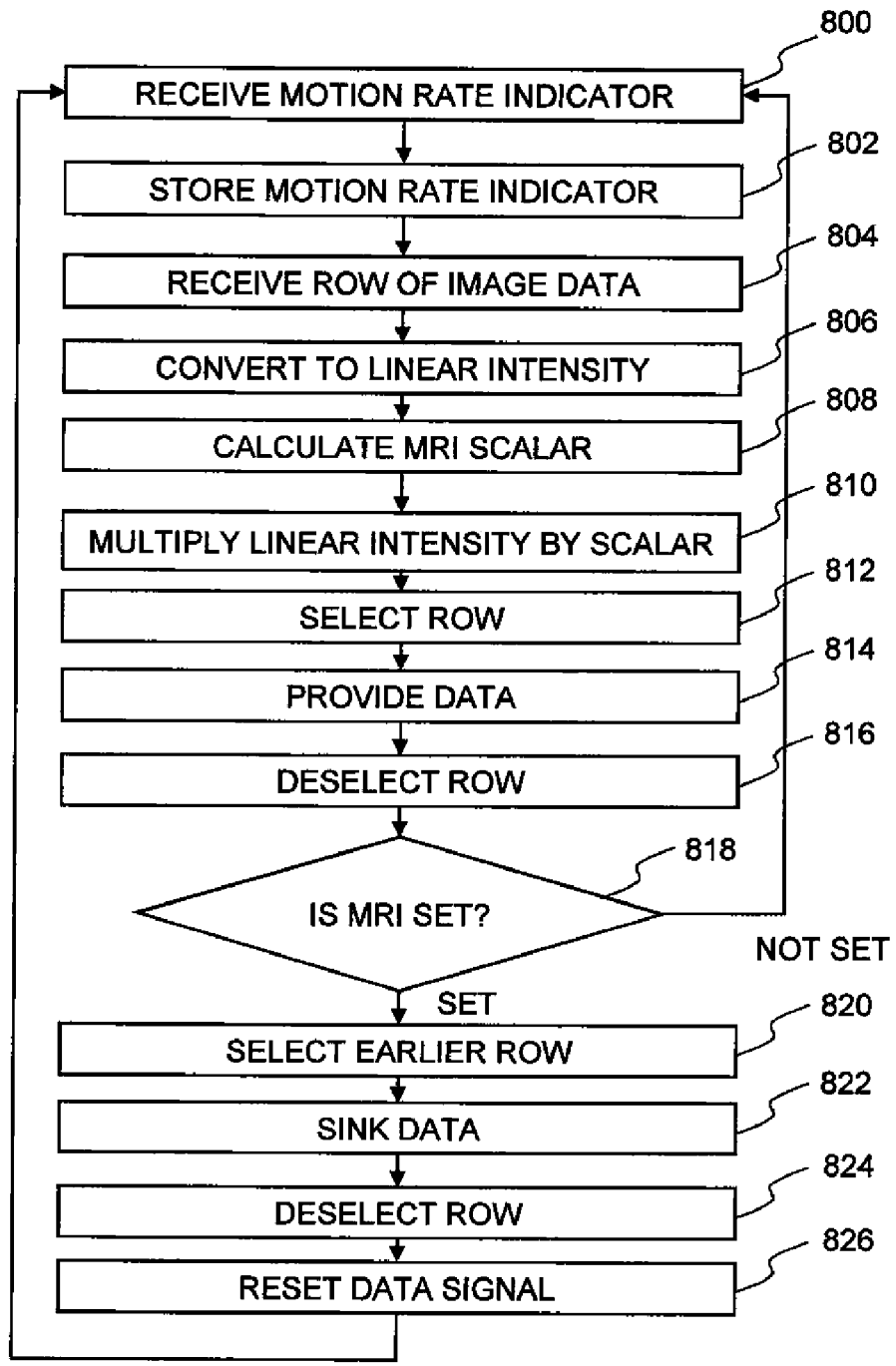
FIG. 12 is a flow chart illustrating the steps that constitute a further embodiment of the present invention.

A detailed method for achieving this method is provided in FIG. 12 for an embodiment of this method wherein each row of data in the input video is preceded by a one-bit motion rate indicator, which indicates whether each row does or does not correspond to a region of the original scene which contains rapid motion. As shown in FIG. 12, a motion rate indicator is received in Step 800 and stored in Step 802. A row of image data is then received in Step 804. This row of image data is converted to linear intensity in step 806. A motion rate indicator scalar is then computed in Step 808. In one embodiment of the present invention, the motion rate indicator includes a small number of bits, e.g. 1, with each higher binary value of the motion rate indicator indicating faster motion. The corresponding motion rate indicator scalar can be computed by simply adding 1 to the motion rate indicator. Note that in the present example, this results in a scalar of 1 if the motion rate indicator is 0, indicating the lack of fast motion and a scalar of 2 if the motion rate indicator is 1, indicating the presence of fast motion. The linear intensity values are then multiplied by this motion rate indicator scalar in Step 810 to provide scaled linear intensity values. A row of the display is then selected in step 812 corresponding to the spatial location of the row of image data and the scaled linear intensity values are used to provide data to the display in Step 814. The row is then deselected in Step 816. The motion rate indicator for a row a half frame earlier in the display is then retrieved and determined whether the motion rate indicator is set in Step 818. If it is not set, indicating the lack of fast motion for that row, the process returns to Step 800 and the next motion rate indicator is received. If this motion rate indicator is set, the row a half frame earlier is selected in Step 820, the signal is removed from this row by sinking the current from the capacitors in the row in Step 822, the row is deselected in Step 824 and the data signal is reset in Step 826. This step turns off the earlier row half way through the update cycle if that row corresponded to a region with fast motion. The process then returns to Step 800 where the next motion rate indicator is received and the process is repeated.

Figure 13:
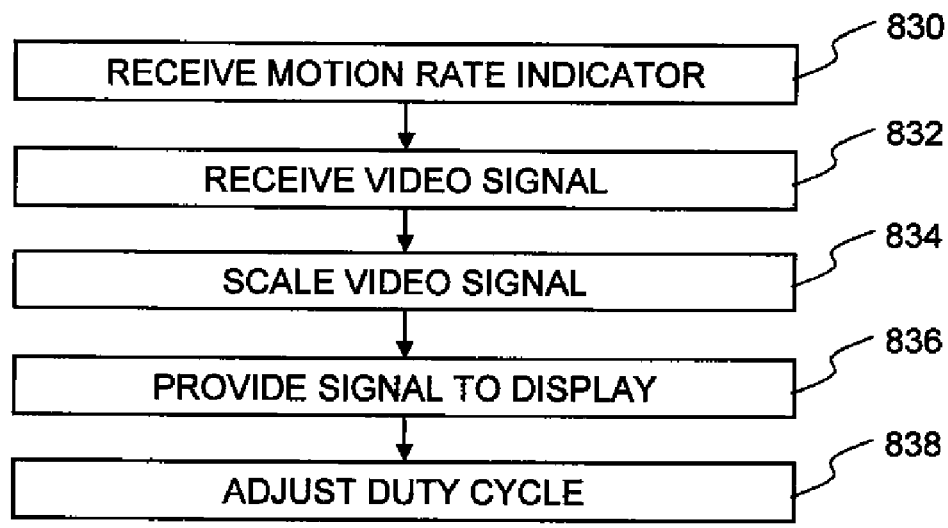
FIG. 13 is a flow chart illustrating the steps that constitute a further embodiment of the present invention.

Although the previous discussion provides a detailed example, this method includes the basic steps shown in FIG. 13. These include receiving motion rate indicators corresponding to regions of a video signal in Step 830, receiving the video signal in Step 832, scaling the video signal as a function of the motion rate indicator in Step 834, providing the data to the display in Step 836 and adjusting the display duty cycle in response to the motion rate indicator in Step 838. As such, the method includes providing a different display duty cycle for the first and second regions of the display as differentiated by the motion rate indicator. This method is particularly useful when the first update rate is faster than the second update rate. Regions with no or relatively slow motion are only updated as new subframes become available, e.g. once per frame time or less, and regions with relatively fast motion are updated twice: once to allow light to be emitted in response to a new subframe and once to extinguish the light as a function of the motion rate indicator. In this system, the first update rate is greater than the first input rate by the fact that regions with faster motion are updated twice (activation and deactivation) for each new subframe.

The motion rate indicators can be used in other ways according the method of the present invention. For example, when the first subframes are defined in terms of motion rate indicators, the system can produce additional first subframes using the first subframes or the second subframes and then provide additional first subframes to the first region of the display to permit the first update rate for the first region to be higher than the second update rate for the second region. That is, the controller 602 in FIG. 5 can respond to the motion rate indicator to identify where rapid motion is occurring and produce additional first subframes for these regions by interpolating new first subframes between the first or second subframes at a rate that relates to the speed of motion present. Methods for producing interpolated images between captured images such as optical flow are well known in the industry, U.S. Pat. No. 7,342,963 describes such a method, which includes a forward motion estimation step includes determining a set of motion vectors associated with the vertices of a mesh representing a first image at an instant t1, and enabling the constructing of a mesh associated with a second image at a subsequent instant t2, and a step for the constructing of an intermediate image from said approximate preceding image. An embodiment of the present invention uses interpolation between frames to produce additional first subframes at a rate that relates to the speed of motion present in the video of the scene. In the above embodiments, the video of a scene is carried in a video signal e.g. NTSC, ATSC, SMPTE 292, MPEG-4, or other signals known in the video art. However, the video of a scene can be provided through a sequence of still images (e.g. JPEG or MNG as known in the image-processing art) or other methods. Most commonly-defined video signals have an active image region and a blanking region, wherein the blanking region permits time for the display to reset. Image data is commonly provided during the active image region but not during the blanking region. In some embodiments of the present invention, the first subframes can be provided without requiring much additional bandwidth. This is particularly true when these subframes are defined through the use of motion vectors or a motion map, or motion rate indicators such as capture rate indicators or exposure time indicators. When the first subframes require less bandwidth than the available bandwidth in the blanking region of the video signal, the first subframe data can be carried in the blanking region of the video signal. Such first subframes generally require less bandwidth than the second subframes, as the blanking region of a video signal is generally lower-bandwidth than the active image region of the video signal. Note that "bandwidth" and "bit-rate" are used interchangeably here to denote the amount of data which can be transferred in a given amount of time.

When the first subframes require low bandwidth compared to the second subframes, e.g. because the first subframes have a smaller number of pixels than the second subframes, the first subframe data can be carried in the active image region by embedding this information in the active image region invisibly to a viewer. In one embodiment of the present invention, a method of watermarking, such as that set forth in commonly-assigned U.S. Pat. No. 6,044,182 to Daly et al., can be used to extract the first subframe data. As set forth in this reference, a decoding carrier image can be selected, preferably identical to an encoding carrier used when producing the video of the scene. The decoding carrier image can be e.g. a linear or log chirp rotated around a centerpoint. The data in the active image region can include an embedded frequency dispersed data image carrying the first subframe data. To extract the frequency dispersed data image, the data in the active image region can be cross-correlated with the decoding carrier image. The data in the active image region which are most highly correlated with the decoding carrier image can be extracted and normalized to produce the frequency dispersed data image. The locations of data centers within the frequency dispersed data image can then be determined by finding the rows and columns of the cross-correlation result with the widest data ranges. The values of the cross-correlation result at the data centers can then be compared to a selected threshold value, e.g. 127.5 on a 0-255 scale, to determine which bits are −1 (e.g. below the threshold), which correspond to binary 0, and which are 1 (e.g. above the threshold). The resulting map of 0s and 1s can be converted to a linear binary message by e.g. a raster scan. The binary message can include digital data, an identification code containing a series of bits that does not occur in the digital data, or error-correction bits. According to the present invention, the binary message can be coded in 4b5b code as known in the telecommunications art, and a 4b5b value not corresponding to a valid four-bit data string can be used as the identification code.

According to the present invention, the data in the active image region can carry the second subframe data and the first subframe data. The extracted binary message holds the first subframe data. For example, if the first subframe data is motion rate indicators, the bits of the binary message can be the bits of a binary representation of the motion rate indicators described above.

Other methods can also be used to reduce the bandwidth of the video signals of the present invention. For instance, it is known that the human visual system has limited spatial and temporal bandwidth in chrominance channels as compared to luminance channels. Therefore, it is possible to reduce the bandwidth, especially for the first subframes, by permitting these subframes to carry primarily luminance data with little or no chrominance data. Image processing methods known in the art can then be used to interpolate the chrominance information from the second subframes to provide adequate chrominance information for the first subframes.

In one embodiment, the video of a scene is captured by an image capture device that detects relative speed of motion of scene regions with respect to each other. This can include, for example, a method as disclosed in the above-referenced commonly-assigned U.S. patent application Ser. No. 12/401,633. An image capture device according to this reference can detect areas of fast motion in the scene and provide first subframe data at a first capture rate corresponding to those areas of fast motion, in addition to second subframe data at a second capture rate less than the first capture rate corresponding to areas of the scene which do not contain fast motion. According to the present invention, the first and second subframes produced by the image capture device are received and displayed to provide reduced motion blur. In a preferred embodiment, the invention is employed in a display that includes Organic Light Emitting Diodes (OLEDs), which are composed of small molecule or polymeric OLEDs as disclosed in but not limited to U.S. Pat. No. 4,769,292, by Tang et al., and U.S. Pat. No. 5,061,569, by VanSlyke et al. Many combinations and variations of organic light emitting materials can be used to fabricate such a display. Other display technologies, including liquid crystal, plasma, projection, reflective or field emissive display technologies, can also be employed in the present invention.

The invention has been described in detail with particular reference to certain preferred embodiments thereof, but it will be understood that variations and modifications can be effected within the spirit and scope of the invention.

PARTS LIST 10a-c pulse signifying initiation of update for second regions
20a-g pulse signifying initiation of update for first regions
30a-i pulse signifying initiation for an update for first regions
42 receive video signal step
44 determine subframe type step
46 select first row step
48 provide data step
50 deselect row step
52 remove data step
54 determine all rows updated step
56 select subsequent row step
58 determine region location step
60 process data step
62 select first row step
64 provide data step
66 deselect row step
68 remove data signal step
70 determine all rows in region updated step
72 select subsequent row step
82 receive video signal step
84 determine subframe type step
86 write second subframe to memory step
88 determine region location step
90 process data step
92 select region step
94 write first subframe to memory step
100 display
110a, 110b second region
120 first region
200 provide video image data step
210 provide subframes to first region step
215 update first region step
220 provide subframes to second region step
225 update second region step
230 user observes displayed video image step
300 image region
310 location of moving object in first frame
320 location of moving object in second frame
330 motion vector
340 timing diagram for second subframes
345 timing diagram for first subframes
350 timing diagram for first subframes
360a-c onset for second subframes
370a-g onset for first subframes
380a-c onset for first subframes
600 display system
602 controller
604 video signal
606 signal
608 first row driver
610 signal
612 column drivers
620 second row driver
622 signal
624 memory
630 second region of the display
634 first region of the display
700a-e first subframes
702a-b second subframes
704a-e region location data
710 portion of active matrix backplane
711 capacitor line
712 select lines
714 select TFT
716 data line 718 capacitor
720 power TFT
722 power line
724 electrode
740*a-i* on time for row in first region
742*a-i* off time for row in first region
744*a-e* on time for row in second region
746 timing diagram for row in first region
748 timing diagram for row in second region
750 timing diagram for row in second region
752 timing diagram for row in a first region
754 timing diagram for row in a first region
756*a-d* time for delivery of subframe data
758*a-c* on time for row in second region
760*a-c* on time for row in a first region
762*a-c* off time for row in a first region
764*a-c* on time for row in a first region
766*a-c* off time for row in a first region
800 receive motion rate indicator step
802 store motion rate indicator step
804 receive row of image data step
806 convert to linear intensity step
808 calculate motion rate indicator data step
810 multiply step
812 select row step
814 provide data step
816 deselect row step
818 determine previous motion rate indicator step
820 select earlier row step
822 sink data step
824 deselect row step
826 reset data signal step
830 receive motion rate indicator step
832 receive video signal step
834 scale video signal step
836 provide signal step
838 adjust duty cycle step

The invention claimed is:

1. A method of displaying, on a display, a video of a scene, the video having a frame rate and resolution selected to provide reduced motion blur, the method comprising:
    (a) receiving, from an image transmission system that has a bandwidth, video image data for the video of the scene, the video having the selected frame rate and the selected resolution to provide reduced motion blur, the video image data including:
        first subframes for a first area of the video image of the scene associated with rapid motion, the first subframes having a first input rate; and
        second subframes for a second area of the video image of the scene, the second subframes having a second input rate less than the first input rate,
        wherein:
            the first subframes correspond to a first region of the display and the second subframes correspond to a second region of the display;
            the bandwidth of the transmission system is insufficient to transmit the selected resolution at the selected frame rate but is sufficient to transmit the first and second subframes; and
            at least two of the second subframes of the video image data includes a feature within the video image data that moves between the at least two of the second subframes; and
    (b) selectively providing the first and second subframes to corresponding regions in the display, and providing the first region of the display with a first update rate and the second region of the display with a second update rate, wherein the first update rate is greater than the second update rate and is equal to the first input rate, so that the displayed image has reduced motion blur.

2. The method of claim 1, wherein the video image data are stored in a memory and step (b) includes selectively providing the first or second subframes from the memory to the display.

3. The method of claim 1, wherein the first subframes include motion vectors.

4. The method of claim 1, wherein step (b) includes
    (i) producing additional first subframes using the first subframes or the second subframes; and
    (ii) providing the additional first subframes to the first region of the display.

5. The method of claim 1, wherein the first and second regions intersect.

6. The method of claim 1, wherein the video of the scene is captured by an image capture device that detects relative speed of motion of scene regions with respect to each other and provides the video image data.

7. The method of claim 1, wherein the video image data of video of the scene are carried in a video signal.

8. The method of claim 7, wherein the video signal has an active image region and a blanking region and wherein first subframe data are carried in the blanking region and second subframe data are carried in the active image region.

9. The method of claim 7, wherein the video signal has an active image region and wherein the second subframe data are carried in the active image region and the first subframe data are carried in a frequency dispersed data image in the active image region.

10. The method of claim 1, wherein the first subframes carry only luminance data, the second subframes carry chrominance data, and the first and second regions overlap.

11. The method of claim 1, wherein the video image data further include region location data related to the first region of the display.

12. The method of claim 1, wherein step (b) further includes modifying selected pixels in the one or more of the second subframes to reduce the visibility of boundaries between the first region and the second region in the displayed video of the scene.

13. The method of claim 1, wherein the display is an electroluminescent display, a liquid crystal display, a plasma display panel, a projection display, a reflective display or a field emissive display.

14. A method of displaying, on a display, a video of a scene, the video having a frame rate and resolution selected to provide reduced motion blur, the method comprising:
    receiving, from an image transmission system that has a bandwidth, video image data for the video of the scene, the video having the selected frame rate and the selected resolution to provide reduced motion blur, the video image data including:
        first subframes for a first area of the video image of the scene associated with rapid motion, the first subframes having a first input rate; and
        second subframes for a second area of the video image of the scene, the second subframes having a second input rate less than the first input rate,
        wherein:
            the first subframes correspond to a first region of the display and the second subframes correspond to a second region of the display;

the bandwidth of the transmission system is insufficient to transmit the selected resolution at the selected frame rate but is sufficient to transmit the first and second subframes; and at least two of the second subframes of the video image data includes a feature within the video image data that moves between the at least two of the second subframes; and selectively providing the first and second subframes to corresponding regions in the display, and providing the first region of the display with a first update rate and the second region of the display with a second update rate, wherein the first update rate is greater than the second update rate, so that the displayed image has reduced motion blur.

15. The method of claim 14, wherein the first subframes carry only luminance data, the second subframes carry chrominance data, and the first and second regions overlap.

16. The method of claim 14, wherein the first subframes are delivered aperiodically.

17. The method of claim 14, wherein the first region of the display is a subset of the second region of the display, wherein the first region of the display has a corresponding total input rate, wherein the total input rate is greater than or equal to the larger of the first input rate and the second input rate, wherein the total input rate is greater than the second input rate, and wherein the first update rate is greater than or equal to the total input rate.

18. The method of claim 17, wherein the total input rate is a function of the first input rate, the second input rate and a selected phase relationship between the first subframes and the second subframes.

19. The method of claim 18, wherein the phase relationship is selected so that the first input rate is not an integer multiple of the second input rate and the total input rate is the rate at which new information is provided to the first region of the display, so that the first region is updated less frequently than the sum of the first input rate and the second input rate.

* * * * *

UNITED STATES PATENT AND TRADEMARK OFFICE
CERTIFICATE OF CORRECTION

PATENT NO. : 8,405,770 B2  
APPLICATION NO. : 12/402577  
DATED : March 26, 2013  
INVENTOR(S) : White et al.

Page 1 of 1

It is certified that error appears in the above-identified patent and that said Letters Patent is hereby corrected as shown below:

On the title page, item (56), under "OTHER PUBLICATIONS", in Column 2, Line 1, delete "al," and insert -- al., --, therefor.

In the Specification

In Column 2, Line 3, delete "rates" and insert -- rates. --, therefor.

In Column 7, Line 2, delete "Φ==0°." and insert -- Φ=0°. --, therefor.

In Column 11, Line 5, delete "regions" and insert -- regions. --, therefor.

Signed and Sealed this  
Third Day of September, 2013

Teresa Stanek Rea  
*Acting Director of the United States Patent and Trademark Office*